(12) United States Patent
Blanc

(10) Patent No.: US 6,888,082 B1
(45) Date of Patent: May 3, 2005

(54) ANALYZING METHOD AND DEVICE FOR AUTOMATICALLY SORTING PRODUCTS SUCH AS FRUIT

(75) Inventor: Philippe Blanc, Montauban (FR)

(73) Assignee: Materiel pour l'Arboriculture Fruitier, Montauban (FR)

( * ) Notice: Subject to any disclaimer, the term of this patent is extended or adjusted under 35 U.S.C. 154(b) by 300 days.

(21) Appl. No.: 10/019,226
(22) PCT Filed: Jun. 6, 2000
(86) PCT No.: PCT/FR00/01545
§ 371 (c)(1), (2), (4) Date: Dec. 28, 2001
(87) PCT Pub. No.: WO01/01071
PCT Pub. Date: Jan. 4, 2001

(30) Foreign Application Priority Data

Jun. 28, 1999 (FR) .............................. 99 08227

(51) Int. Cl.[7] .................................................. B07C 5/01
(52) U.S. Cl. ..................... 209/576; 209/577; 209/580; 209/578; 209/939; 209/540; 209/541; 209/701
(58) Field of Search ................................ 209/576, 577, 209/578, 580, 509, 545, 581, 587, 701, 939, 540, 541

(56) References Cited

U.S. PATENT DOCUMENTS

| | | | | |
|---|---|---|---|---|
| 3,770,111 A | * | 11/1973 | Greenwood et al. | 209/580 |
| 4,106,628 A | * | 8/1978 | Warkentin et al. | 209/556 |
| 4,482,061 A | * | 11/1984 | Leverett | 209/592 |
| 4,515,275 A | * | 5/1985 | Mills et al. | 209/558 |
| 4,534,470 A | * | 8/1985 | Mills | 209/585 |
| 4,586,613 A | * | 5/1986 | Horii | 209/556 |
| 4,687,107 A | * | 8/1987 | Brown et al. | 209/556 |
| 4,693,607 A | * | 9/1987 | Conway | 356/627 |
| 4,726,898 A | * | 2/1988 | Mills et al. | 209/545 |
| 5,020,675 A | * | 6/1991 | Cowlin et al. | 209/538 |
| 5,156,278 A | * | 10/1992 | Aaron et al. | 209/556 |
| 5,339,963 A | * | 8/1994 | Tao | 209/581 |
| 5,791,497 A | * | 8/1998 | Campbell et al. | 209/577 |
| 6,252,189 B1 | * | 6/2001 | Campbell | 209/581 |
| 6,410,872 B2 | * | 6/2002 | Campbell et al. | 209/577 |
| 6,433,293 B1 | * | 8/2002 | Bollinger et al. | 209/511 |
| 6,600,826 B1 | * | 7/2003 | Xavier | 381/384 |
| 6,610,953 B1 | * | 8/2003 | Tao et al. | 209/577 |
| 6,657,722 B1 | * | 12/2003 | Nagayoshi | 356/326 |
| 2001/0032807 A1 | * | 10/2001 | Powell, Jr. | |

FOREIGN PATENT DOCUMENTS

| | | | |
|---|---|---|---|
| EP | 0 258 810 | | 3/1988 |
| FR | 2 772 358 | | 6/1999 |
| JP | 62-279875 | * | 4/1987 |
| WO | WO 91/04803 | | 4/1991 |
| WO | WO 94/10555 | | 5/1994 |

* cited by examiner

Primary Examiner—Donald P. Walsh
Assistant Examiner—Jonathan R Miller
(74) Attorney, Agent, or Firm—Young & Thompson

(57) ABSTRACT

A method of analysing products arranges above a conveyer line three successive analysing stations having, in the first station, two cameras arranged in such a way that their optical axes form a V centred on the products and has a vertex angle in the range between 90° and 130°, and in the other two stations, a camera arranged plumb with the conveyer line. Moreover, the products are driven in rotation during their transport along the analysing stations, in such a way that the cameras each take a number of photographs of complementary faces of the surface of the products, and there are selected from among the photographs taken, by a comparison between the calculated theoretical diameter of a product and a predetermined average diameter, the photographs to be retained so as to obtain a complete analysis of the total surface of the product.

20 Claims, 3 Drawing Sheets

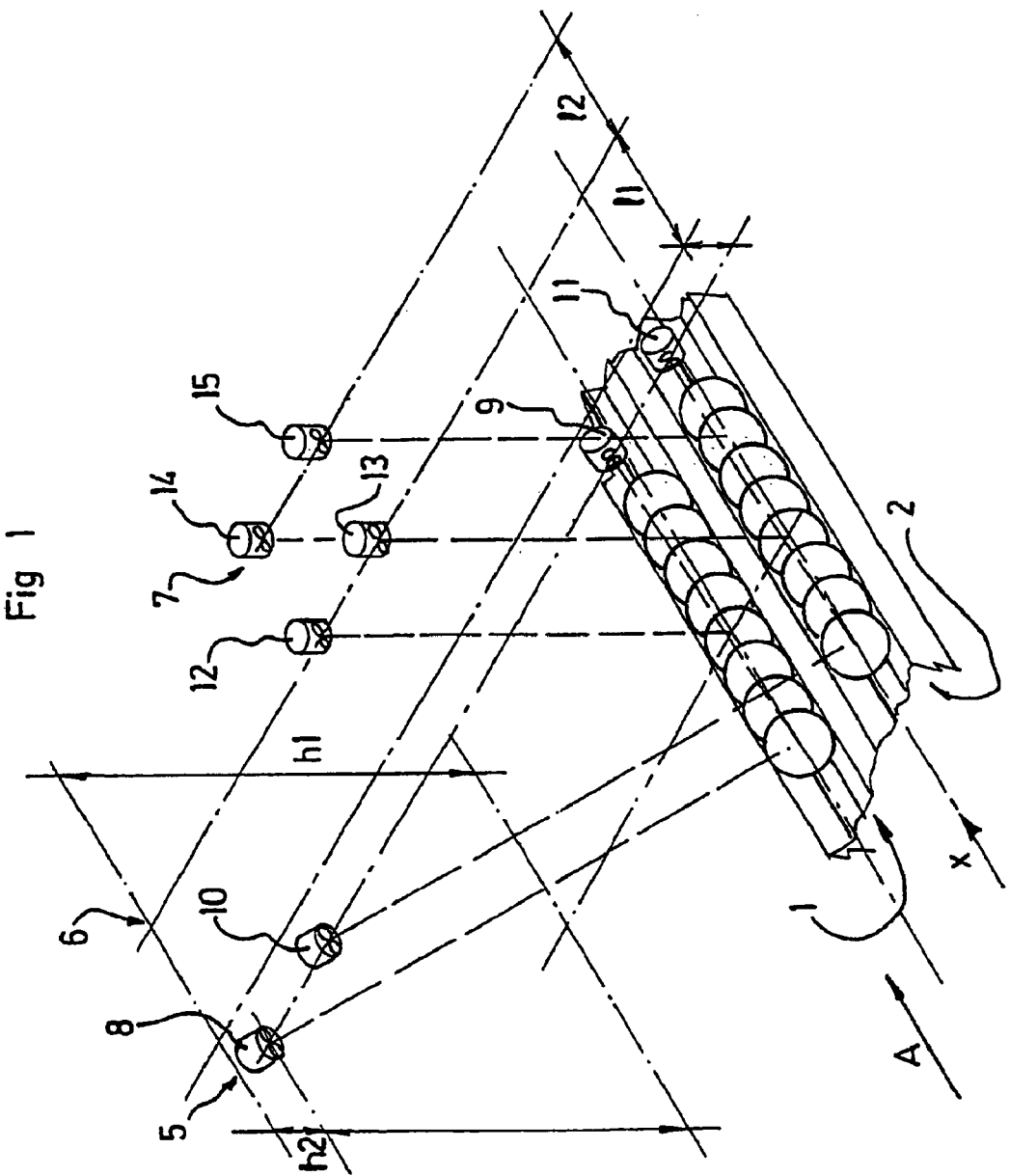

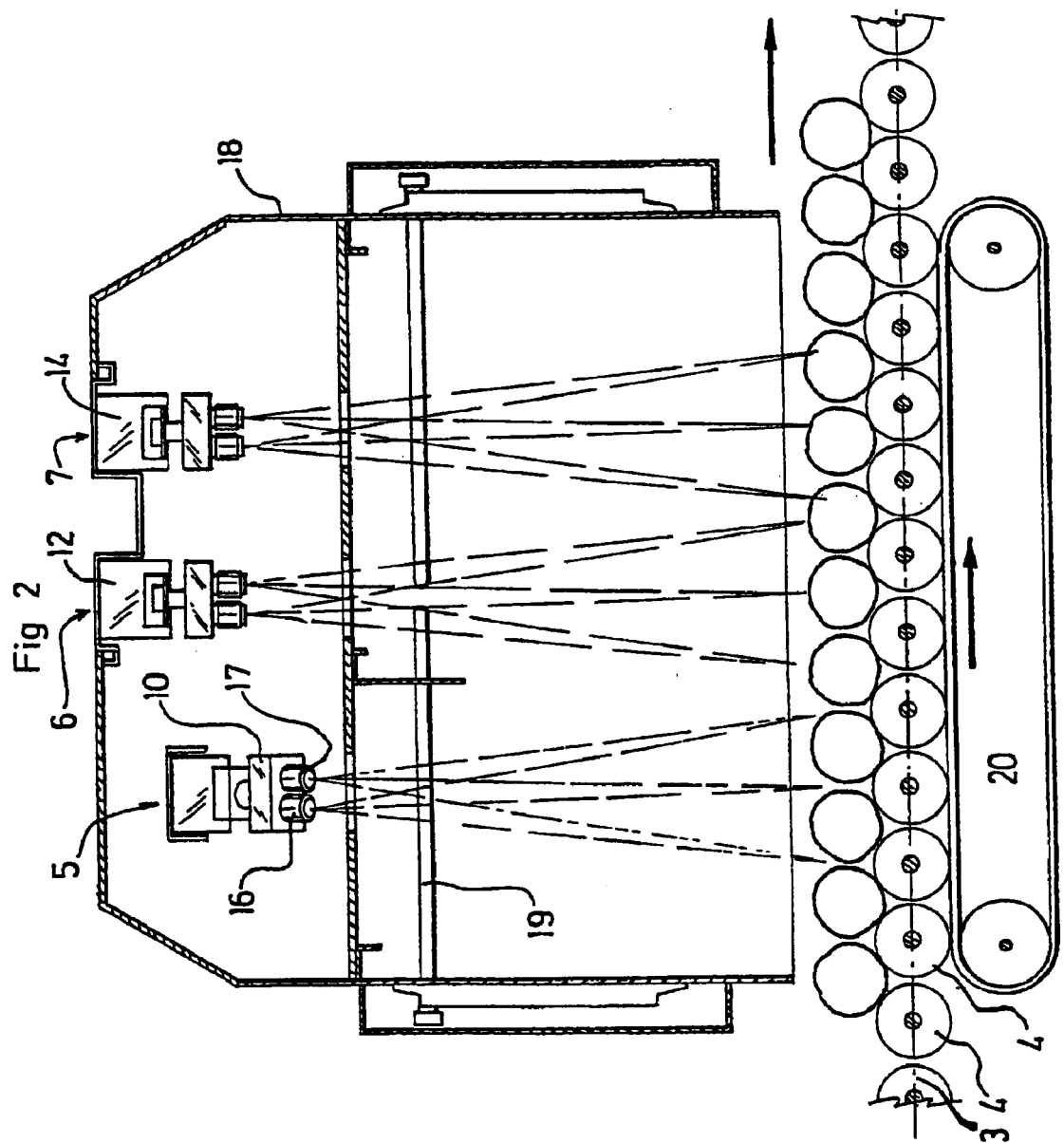

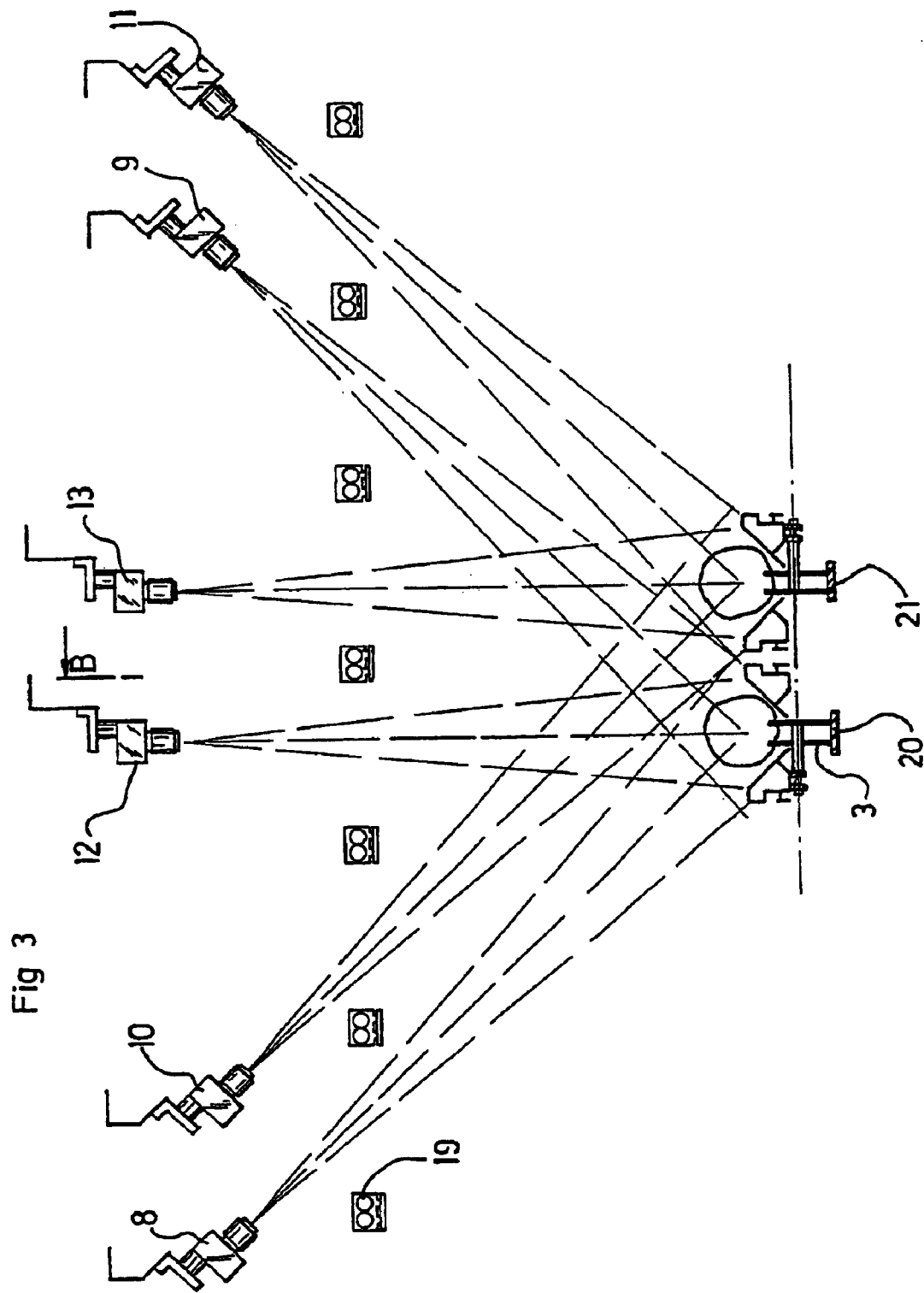

ANALYZING METHOD AND DEVICE FOR AUTOMATICALLY SORTING PRODUCTS SUCH AS FRUIT

BACKGROUND OF THE INVENTION

The invention relates to an analysing method and device with a view to the automatic sorting of products such as pieces of fruit.

DESCRIPTION OF THE RELATED ART

At the present time, numerous techniques exist which are intended to permit the analysis of products such as pieces of fruit, with a view to permitting the automatic sorting of the products in such a way as to obtain batches which are homogeneous in terms of both quality and colour.

A first technique consists in arranging one or more cameras above and/or on the side of a conveyer in such a way as to analyse a surface portion of the pieces of fruit transported on the conveyer. However, this solution leads to a not insignificant error rate, because only one portion of the surface of the products is analysed. Consequently, defects which these products exhibit on faces which are not visible are not taken into account during sorting.

In order to overcome this drawback, one solution consists in arranging four cameras which are distributed around a conveyer, at its junction with another conveyer which is raised in relation to the conveyer, in such a way as to analyse the pieces of fruit when they drop. This solution does, in fact, make it possible to analyse the major part of the surface of the products. In the first place, however, this solution does not permit the analysis of the whole of the upper and lower faces of the products. Moreover, the fact that the products are subjected to dropping constitutes a not insignificant risk of bruising them.

Another technique which is very commonly employed and which is described, in particular, in U.S. Pat. No. 4,726,898, consists in arranging a camera above the conveyer and in causing the product to revolve on itself at high speed plumb with the camera. According to this technique, the position and optical field of the camera are adapted so that the latter displays four or five pieces of fruit, so that a number of successive faces of each piece of fruit which is driven in rotation are viewed successively by the camera. One of the advantages deriving from this arrangement resides in the fact that a single camera permits the analysis of pieces of fruit which are moving along on two parallel conveyer lines. On the other hand, this arrangement makes it necessary for the camera to be relatively remote from the conveyer lines, and leads to a loss of resolution which manifests itself in practice in an inability to detect very small specks, such as "diffuse russeting". Moreover, it turns out that, according to this technique, those speeds of rotation of the pieces of fruit which can be physically obtained lead to the displaying of only about 80% of the total surface of the pieces of fruit. Finally, the defects in those zones of the pieces of fruit which are viewed with a high degree of incidence turn out to be poorly analysed. The consequence of this combination of facts is that, in practice, 25% to 30% of the surface of the pieces of fruit is either simply not analysed or else is poorly analysed.

In order to overcome this combination of drawbacks, other solutions have been proposed which consist, for example, in suspending the products or transporting them on a transparent conveyer. However, these solutions have proved unworkable in practice.

Another technique which is described in EP Patent 0,258,810, consists in arranging a camera above the conveyer, a plurality of mirrors which are distributed above and on the sides of the conveyer in such a way as to allow the camera to display the upper face and side faces of the products, and a plurality of lighting lamps distributed above the conveyer. Apart from the lower face of the products, which is resting on the conveyer, this solution therefore permits the analysis of the major part of the surface of the products without the risk of bruising the latter. However, the implementation of such a technique proves to be relatively complex. In fact, the implementation makes it necessary, in particular, to arrange the lighting lamps in such a way as not to dazzle the camera, an arrangement which proves awkward to obtain if it is desired to obtain uniform lighting. Likewise, the relative positions of the camera and the various mirrors have to be absolutely precise, and this proves to be not very easy because of the congestion problems linked with the presence of the conveyer. Furthermore, the principle adopted, which consists in using a CCD camera divided up into analyzing segments, leads to a not insignificant reduction in the resolution of the sensor.

Another technique, which is described in Patent Application WO 94/10555 and U.S. Pat. No. 5,156,278, consists firstly in providing four successive analysing stations arranged at a distance from one another along the conveyer and each comprising a lens which is arranged plumb with the conveyer and connected to a lens/filters/photodiodes unit by an optical cable. Moreover, according to this technique, the pieces of fruit are carried by a conveyer equipped with rollers which are mounted so as to rotate freely about a transverse axis, and the rollers are caused to revolve about their axes of rotation between the stations, so that each piece of fruit undergoes a rotation of about 90° between two stations, whereas the piece of fruit is rotationally immobile when plumb with each of the stations. Such a technique therefore makes it possible to display the whole of the surface of the pieces of fruit owing to the fact that complementary faces of the latter are analysed at each station. However, it has one drawback which results from the differences in size of the pieces of fruit analysed. In actual fact, the rotation which a piece of fruit with a given diameter undergoes differs from that undergone by a fruit with a different diameter so that, since the angle of rotation is necessarily calculated for a piece of fruit with a given average diameter, pieces of fruit which are larger in size are not viewed in their entirety, whereas overlapping zones of pieces of fruit which are smaller in size are displayed, leading to erroneous analysis of the surface of the pieces of fruit.

SUMMARY OF THE INVENTION

The present invention sets out to overcome all the drawbacks of the techniques described above, and has the essential object of providing a product-analysing device which is very simple to implement and operate and which permits the analysis of the whole of the surface of the products in spite of differences in the dimensions of the latter.

To that end, the invention relates to an analysing method with a view to sorting products such as pieces of fruit which are transported along an axis (x) on a conveyer line having a plurality of rollers which are mounted so as to each rotate freely about a transverse axis of rotation orthogonal to the axis (x), and which are spaced apart in such a way that two adjoining rollers define, between them, a seating for a product, the analysing method consisting in using analysing means which are split up into a number of successive stations arranged at a distance from one another along the axis (x), and in causing the rollers to revolve about their axes of rotation between the stations in such a way as to display, at each of the stations, different faces of each product.

In the analysing method according to the invention:

three analysing stations are arranged along the conveyer line, and each of the analysing stations is equipped with at least one camera which is orientated and adapted to make, with an adjustable frequency, photographs of the products transported by the conveyer line, one of the stations having two cameras which are arranged on either side of the conveyer line in the same vertical plane orthogonal to the axis (x), and are orientated in such a way that their respective optical axes form a V which is centred on the axis (x) and has a vertex angle substantially in the range between 90° and 130°, the other two stations each comprising a camera which is arranged plumb with the conveyer line and is orientated in such a way that its optical axis is vertical and secant with the axis (x), in a preliminary phase, there are determined the average diameter of the products to be analysed and, as a function of the average diameter, a speed of rotation of the rollers which is adapted so that a product of average diameter which is located in the plane of a camera at the first station and is caused to revolve on itself along the whole of the analysing means under the effect of the rotation of the rollers, undergoes a rotation such that four complementary zones on its surface are viewed by the respective cameras of the first, second and third stations, and during the conveying of the products, the rollers are caused to revolve continuously at the predetermined speed of rotation, and for each product:

mi photographs of this product are made at the first station, where $i \geq 3$, nj photographs at the second station, where $j \geq 1$, and pk photographs at the third station, where $k \geq 3$, the theoretical diameter of the product is calculated from the photographs made, and the photographs mi, nj and pk to be taken into account with a view to analysing the product are determined by comparison of the theoretical diameter of this product with the predetermined average diameter, in such a way as to obtain a complete analysis, without overlapping or with a given overlap, of the total surface of the product.

According to the method of the invention, on the one hand the cameras are arranged and orientated, and on the other, each product is caused to revolve continuously during its transport along the analysing device, in such a way that the product is displayed in accordance with four different angles adapted to permit the analysis of four complementary faces of a product with a given average diameter. Moreover, in order to take into account the differences in diameter of the products analysed in relation to the predetermined average diameter:

the theoretical diameter of each product is, first of all, determined in conventional manner, the nature of the photograph to be taken into account with a view to analysis is deduced, from among the photographs made at the various stations, from the comparison between the theoretical diameter calculated and the predefined average diameter, in such a way as to obtain a complete analysis of the total surface of the product.

This selection of the photographs to be analysed is carried out very easily. By way of example, if the photographs mi, nj and pk correspond to a product of average diameter, and if i, j, k, photographs are taken at each station, where $i-x \leq i \leq i+x$, $j-y \leq j \leq j+y$, and $k-z \leq k \leq k+z$, the photographs will be:

in the case of a product with a theoretical diameter substantially equal to the average diameter: mi, nj, pk, in the case of a product with a diameter smaller than the average diameter, m (i+x), n (j−y) and p (k−z) photographs, where x, y, z are of an order which is a function of the difference in diameter, in the case of a product with a diameter greater than the average diameter, m (i−x), n (j+y) and p (k+z) photographs, where x, y, z are of an order which is a function of the difference in diameter.

A method of this kind which therefore combines the use of a number of cameras distributed and orientated in a specific manner, the setting of the products in rotation at a given speed of rotation, and the selection of the photographs taken by the cameras as a function of the theoretical diameter of the products, permits the analysis of the whole of the surface of each product without overlapping or with a known overlap, and to do so in spite of the differences in size of the products.

According to one advantageous mode of implementation, a speed of rotation of the rollers is determined which is adapted so that a product of average diameter undergoes a rotation on itself with an angle of rotation substantially in the range between 110° and 130° between the first and second stations, and with an angle of rotation substantially in the range between 105° and 115° between the second and third stations.

These angles of rotation, which are associated with the arrangement of the two cameras situated at one of the stations, lead to the obtention of shots of each product which are equivalent to those which would be obtained from four cameras arranged at the four vertices of a tetrahedron and orientated towards the barycentre of the tetrahedron, by placing the product at the barycentre.

These angles of rotation may advantageously be obtained:

by arranging the stations of analysing means in such a way that the distance between the first and second stations is substantially in the range between 1.1 and 1.2 times the distance between the second and third stations, and by causing the rollers to revolve in rotation at a constant speed of rotation along the whole of the analysing device.

According to one advantageous mode of implementation, a speed of rotation of the rollers is determined which is adapted so that a product of average diameter undergoes a rotation on itself with an angle of rotation substantially equal to 125.5° between the first and second stations, and with an angle of rotation substantially equal to 109° between the second and third stations.

Moreover, the cameras of the station comprising two cameras are advantageously arranged in such a way that their respective optical axes define a V with a vertex angle substantially equal to 109°.

These angles of rotation and orientation of the two cameras lead to the obtention of an optimum shooting system equivalent to a system whose four cameras would be arranged at the four vertices of a regular tetrahedron.

In order to obtain these angles of rotation, and in an advantageous manner, the distance between the first and second stations is substantially equal to 1.15 times the distance between the second and third stations.

Furthermore, the first station is advantageously equipped with two cameras, and the second and third stations with one camera. The fact that the two cameras are arranged at the first station permits better definition of the theoretical diameter of the products.

Furthermore, and in an advantageous manner, three photographs of each product are taken at the first and third stations, and a single photograph of the products at the second station.

The invention extends to an analysing device with a view to the automatic sorting of products such as pieces of fruit, the device comprising:

a conveyer line for transporting the products along a longitudinal axis (x), the line having a plurality of rollers which are mounted so as to each rotate freely about a transverse axis of rotation orthogonal to the axis (x) and are spaced apart in such a way that two adjoining rollers define, between them, a seating for a product, means for analysing the surface of the products, which means are arranged above the conveyer line and have a number of successive stations arranged at a distance from one another along the axis (x), means for driving the rollers in rotation about their axes of rotation, which means are suitable for bringing about rotation of the rollers between the analysing stations in such a way that different faces of the products are analysed at each station, and a processing unit adapted to receive information emanating from the analysing means, and to calculate workable sorting data from predefined, programmed criteria.

In the analysing device according to the invention:

the analysing means comprise three analysing stations, each of the analysing stations having at least one camera which is orientated and adapted to make, with an adjustable frequency, photographs of the products transported by the conveyer line, one of the stations having two cameras which are arranged on either side of the conveyer line in the same vertical plane orthogonal to the axis (x), and are orientated in such a way that their respective optical axes form a V which is centred on the axis (x) and has a vertex angle substantially in the range between 90° and 130°, the other two stations each comprising a camera which is arranged plumb with the conveyer line and is orientated in such a way that its optical axis is vertical and secant with the axis (x), the means for driving the rollers in rotation are arranged in such a way as to bring about continuous rotation of the rollers along the analysing means, at a speed of rotation which is adapted so that a product of predetermined average diameter which is located in the plane of a camera at the first station and is caused to revolve on itself along the whole of the analysing means under the effect of the rotation of the rollers, undergoes a rotation such that four complementary zones of its surface are viewed by the respective cameras of the first, second and third stations, the processing unit is adapted to:

process, for each product, mi photographs of the products taken at the first station, where $i \geq 3$, nj photographs taken at the second station, where $j \geq 1$, and pk photographs, at the third station, where $k \geq 3$, and to determine, by a comparison of the theoretical diameter of the product with the predetermined average diameter, the mi, nj and pk photographs to be taken into account with a view to analysing the product, in such a way as to obtain a complete analysis, without overlapping or with a given overlap, of the total surface of the product.

According to an advantageous mode of embodiment, the first station has two cameras, while the second and third stations have a single camera.

Moreover, the distance between the first and second stations is advantageously substantially in the range between 1.1 and 1.2 times the distance between the second and third stations. This distance between the first and second stations is preferably substantially equal to 1.15 times the distance between the second and third stations.

Moreover, the cameras of the station comprising two cameras are advantageously orientated in such a way that their respective optical axes define a V with a vertex angle substantially equal to 109°.

Furthermore, according to one advantageous mode of embodiment, the means for driving the rollers in rotation comprise an endless belt extending, underneath the conveyer line, along the analysing means, and arranged in such a way as to be tangential to the lower generatrix of the rollers, and means for driving the endless belt which are suitable for causing the latter to run at a regulable running speed which is different from that of the conveyer line.

Moreover, the means for driving the endless belt are advantageously adapted to drive it in the same direction of displacement as that of the conveyer line at an adjustable running speed which is lower than that of the conveyer line.

Other characteristics, aims and advantages of the invention will emerge from the detailed description which follows, with reference to the appended drawings which represent, by way of a non-limitative example, a preferred mode of embodiment of the invention.

BRIEF DESCRIPTION OF THE DRAWINGS

In the drawings:

FIG. 1 is a view, in diagrammatic perspective, of an analysing device according to the invention, installed on a conveyer device having two product-conveying lines, FIG. 2 is a diagrammatic longitudinal section through a vertical plane B of the analysing device, and FIG. 3 is a front view of the analysing device, in the direction of the arrow A.

DESCRIPTION OF THE PREFERRED EMBODIMENTS

In the figures, the analysing device according to the invention is represented installed on a fruit-conveying device having two parallel conveying lines 1, 2. Each of these conveying lines 1, 2 comprises a plurality of rollers such as 3, 4 which are mounted so as to each rotate freely about a transverse axis of rotation, and are spaced apart in such a way that two successive rollers define, between them, a seating for a piece of fruit. Conveyer lines of this kind are, for example, of the same type as those described in Patent Application FR-2,772,358, to which reference may be made for more details.

This analysing device comprises three analysing stations, 5, 6, 7 which are arranged successively at a distance from one another along the conveyer lines 1, 2, and have, for each of the conveyer lines:

in the case of the first station 5, two cameras B, 9–10, 11 arranged on either side of the conveyer line 1–2, in the same vertical plane orthogonal to the direction of displacement of the conveyer line, the cameras being orientated in such a way that their optical axes form a V which is centred on a piece of fruit of average diameter and has a vertex angle substantially in the range between 90° and 130°, in the case of the second station 6, a camera 12–13 which is arranged plumb with the conveyer line 1–2, and is orientated in such a way that its optical axis is vertical and secant in relation to the longitudinal axis of the conveyer line, in the case of the third station 7, a camera 14–15 which is arranged plumb with the conveyer line 1–2, and is orientated in such a way that its optical axis is vertical and secant in relation to the longitudinal axis of the conveyer line.

Moreover, the analysing stations 5, 6, 7 are spaced apart from one another in such a way that the distance 11 between the optical axes of the respective cameras 8–11 and 12–13 of the first station 5 and second station 6 is equal to 1.15 times the distance 12 between the optical axes of the respective cameras 12–13, 14–15 of the second station 6 and third station 7. In practice, by way of an example, 11 is substantially equal to 26 cm, and 12 is therefore substantially equal to 22 cm.

Moreover, the cameras 12–15 of the second station 6 and third station 7 are arranged in such a way that their lenses are situated at a height h1 which is substantially equal to 80 cm above the conveyer lines, whereas the lens of the cameras 8–11 of the first station 5 extends to a height h1–h2, where h2 is substantially equal to 9 cm, above the conveyer lines.

Furthermore, each camera 8–15 has, in a single casing, two distinct cameras such as 16, 17 which are adapted to make photographs which are fully superimposable: a conventional (RVB) camera 16 and an infrared camera 17. Moreover, these cameras 16, 17 are "single-shot" cameras suitable for taking in the region of 25 photographs per second.

The group of cameras 8–15 is integrated into a single case 18 of conventional type, which also incorporates lighting means such as 19, of a type which is known per se.

The analysing device according to the invention further comprises, plumb with the case 18 and for each conveyer line 1, 2, an endless belt 20, 21, which is arranged in such a way as to come into tangential contact with the lower generatrix of the rollers 3, 4, and means for driving the endless belts, which means are suitable for displacing them at an adjustable speed in the same direction of displacement as that of the conveyer lines.

The functioning of the analysing device according to the invention is described below.

First of all, and in a preliminary phase, the average diameter of the pieces of fruit conveyed is determined. The speed of displacement of the endless belts 20, 21 is then adjusted, as a function of the running speed of the conveyer lines 1, 2, in such a way that the rotation of the rollers 3, 4 leads an average piece of fruit to undergo a rotation on itself with an angle of 125.50 over the distance 11 separating the first and second stations 5, 6 and consequently, taking into account the constant running speed of the endless belts and conveyer lines, a rotation on itself of 109° over the distance 12 separating the second and third stations 6, 7.

In the course of analysis, three mi photographs, where $i-1 \leq i \leq i+1$, of each piece of fruit are taken at the first station 5, a single photograph n at the second station, and three pk photographs, where $k-1 \leq k \leq k+1$ at the third station.

After conventional, analog/numerical type conversion, these photographs are stored and their processing consists in:

calculating the theoretical diameter of each piece of fruit from the mi and n photographs taken at the first and second stations 5, 6, determining, from the calculation of the theoretical diameter, the photographs to be taken into account with a view to calculating the workable sorting data, the determination consisting in selecting:

in the case of a piece of fruit with a diameter equal or close to the average diameter, the mi, n and pk photographs, in the case of a piece of fruit of small size, that is to say with a diameter smaller than the average diameter, the m (i+1), n and p (k−1) photographs, and, in the case of a piece of fruit of large size, that is to say with a diameter greater than the average diameter, the m (i−1), n and p (k+1) photographs.

It should be noted that although the figures represent a conveyer equipped with two conveyer lines, the analysing device can be installed on a conveyer equipped with n parallel lines, where $n \geq 1$, the number of cameras 815 then being equal to 4 n, with 2 n cameras at the first station 5, and n cameras at each of the second and third stations 6, 7.

What is claimed is:

1. An analysing method for sorting products which are transported along an axis (x) on a conveyer line having a plurality of rollers (3, 4) which are mounted so as to each rotate freely about a transverse axis of rotation orthogonal to the axis (x), and which are spaced apart in such a way that two adjoining rollers (3, 4) define, between them, a seating for a product, the analysing method consisting in using analysing means which are split up into a number of successive stations (5, 6, 7) arranged at a distance from one another along the axis (x), and in causing the rollers (3, 4) to revolve about their axes of rotation between the stations (5, 6, 7) in such a way as to display, at each of the stations, different faces of each product, wherein:

three analysing stations (5–7) are arranged along the conveyer line, and each of the analysing stations is equipped with at least one camera (8, 9, 12, 14) which is orientated and adapted to make, with an adjustable frequency, photographs of the products transported by the conveyer line, one of the stations (5) having two cameras (8, 9) which are arranged on either side of the conveyer line in the same vertical plane orthogonal to the axis (x), and are orientated in such a way that their respective optical axes form a V which is centred on the axis (x) and has a vertex angle substantially in the range between 90° and 130°, the other two stations (6, 7) each comprising a camera (12, 14) which is arranged plumb with the conveyer line and is orientated in such a way that its optical axis is vertical and secant with the axis (x), in a preliminary phase, there are determined the average diameter of the products to be analysed and, as a function of the average diameter, a speed of rotation of the rollers (3, 4) which is adapted so that a product of average diameter which is located in the plane of a camera (8, 9) at the first station (5) and is caused to revolve on itself along the whole of the analysing means under the effect of the rotation of the rollers, undergoes a rotation such that four complementary zones on its surface are viewed by the respective cameras (B, 9, 12, 14) of the first, second and third stations (5–7), and during the conveying of the products, the rollers (3, 4) are caused to revolve continuously at the predetermined speed of rotation, and for each product:

mi photographs of this product are made at the first station (5), where i≧3, nj photographs at the second station (6), where j≧1, and pk photographs at the third station (7), where k≧3, the theoretical diameter of the product is calculated from the photographs made, and, from the photographs made at the three stations, the individual photographs from the three stations to be taken into account with a view to analysing the product are determined by comparison of the theoretical diameter of the product with the predetermined average diameter, in such a way as to obtain a complete analysis, without overlapping or with a given overlap, of the total surface of the product.

2. An analysing method as claimed in claim 1, wherein a speed of rotation of the rollers (3, 4) is determined which is adapted so that a product of average diameter undergoes a rotation on itself with an angle of rotation substantially in the range between 110° and 130° between the first and second stations (5, 6), and with an angle of rotation substantially in the range between 105° and 115° between the second and third stations (6, 7).

3. An analysing method as claimed in claim 2, wherein the stations (5–7) of analysing means are arranged in such a way that the distance between the first and second stations (5, 6) is substantially in the range between 1.1 and 1.2 times the distance between the second and third stations (6, 7), and the rollers (3, 4) are caused to revolve in rotation at a constant speed of rotation along the whole of the analysing device.

4. An analysing method as claimed in claim 1, wherein a speed of rotation of the rollers (3, 4) is determined which is adapted so that a product of average diameter undergoes a rotation on itself with an angle of rotation substantially equal to 125.5° between the first and second stations (5, 6), and with an angle of rotation substantially equal to 109° between the second and the third stations (6, 7).

5. An analysing method as claimed in claim 2, wherein the distance between the first and second stations (5, 6) is substantially equal to 1.15 times the distance between the second and third stations (6, 7).

6. An analysing method as claimed in claim 2, wherein the cameras (8, 9) of the station (5) comprising two cameras are arranged in such a way that their respective optical axes define a V with a vertex angle substantially equal to 109°.

7. An analysing method as claimed in claim 1, wherein the first station (5) is equipped with two cameras (8, 9), and the second and third stations (6, 7) with one camera (12, 14).

8. An analysing method as claimed in claim 1, wherein three photographs of each product are taken by each camera at the first and third stations (5, 7), and a single photograph of the products is taken by each camera at the second station (6).

9. An analysing device or the automatic sorting of products, the device comprising:

a conveyer line for transporting the products along a longitudinal axis (x), the line having a plurality of rollers (3, 4) which are mounted so as to each rotate freely about a transverse axis of rotation orthogonal to the axis (x) and are spaced apart in such a way that two adjoining rollers (3, 4) define, between them, a seating for a product, means for analysing the surface of the products, which means are arranged above the conveyer line and have a number of successive stations (5–7) arranged at a distance from one another along the axis (x), means (20) for driving the rollers (3, 4) in rotation about their axes of rotation, which means are suitable for bringing about rotation of the rollers between the analysing stations (5–7) in such a way that different faces of the products are analysed at each station, and a processing unit adapted to receive information emanating from the analysing means, and to calculate workable sorting data from predefined, programmed criteria, wherein:

the analysing means comprise three analysing stations, each of the analysing stations (5–7) having at least one camera (8, 9, 12, 14) which is orientated and adapted to make, with an adjustable frequency, photographs of the products transported by the conveyer line, one of the stations (5) having two cameras (8, 9) which are arranged on either side of the conveyer line in the same vertical plane orthogonal to the axis (x), and are orientated in such a way that their respective optical axes form a V which is centred on the axis (x) and has a vertex angle substantially in the range between 90° and 130°, the other two stations (6, 7) each comprising a camera (12, 14) which is arranged plumb with the conveyer line and is orientated in such a way that its optical axis is vertical and secant with the axis (x), the means (20) for driving the rollers (3, 4) in rotation are arranged in such a way as to bring about continuous rotation of the rollers along the analysing means, at a speed of rotation which is adapted so that a product of predetermined average diameter which is located in the plane of a camera (8, 9) at the first station (5) and is caused to revolve on itself along the whole of the analysing means under the effect of the rotation of the rollers, undergoes a rotation such that four complementary zones of its surface are viewed by the respective cameras (8, 9, 12, 14) of the first, second and third stations (5–7), the processing unit is adapted to:

process, for each product, mi photographs of the products taken at the first station (5), where i≧3, nj photographs taken at the second station (6), where j≧1, and pk photographs taken at the third station (7), where k≧3, and to determine, by a comparison of the theoretical diameter of this product with the predetermined average diameter, from the photographs made at the three stations, the individual photographs from the three stations to be taken into account with a view to analysing the product, in such a way as to obtain a complete analysis, without overlapping or with a given overlap, of the total surface of the product.

10. An analysing device as claimed in claim 9, wherein the first station (5) has two cameras (8, 9), the second and third stations (6, 7) having a single camera (12, 14).

11. An analysing device as claimed in claim 9, wherein the distance between the first and second stations (5, 6) is substantially in the range between 1.1 and 1.2 times the distance between the second and third stations (6, 7).

12. An analysing device as claimed in claim 11, wherein the distance between the first and second stations (5, 6) is substantially equal to 1.15 times the distance between the second and third stations (6, 7).

13. An analysing device as claimed in claim 9, wherein the cameras (8, 9) of the station (5) comprising two cameras are advantageously orientated in such a way that their respective optical axes define a V with a vertex angle substantially equal to 109°.

14. An analyzing device as claimed in claim 9, wherein the means for driving the rollers (3, 4) in rotation comprise an endless belt (20) extending, underneath the conveyer line, along the analysing means, and arranged in such a way as to be tangential to the lower generatrix of the rollers, and means for driving the endless belt which are suitable for causing the latter to run at a regulable running speed which is different from that of the conveyer line.

15. An analysing device as claimed in claim 14, wherein the means for driving the endless belt (20) are adapted to drive it in the same direction of displacement as that of the conveyer line at an adjustable running speed which is lower than that of the conveyer line.

16. An analysing method for sorting products which are transported along an axis (x) on a conveyer line having a plurality of rollers (3, 4) which are mounted so as to each rotate freely about a transverse axis of rotation orthogonal to the axis (x), and which are spaced apart in such a way that two adjoining rollers (3, 4) define, between them, a seating for a product, the analysing method consisting in using analysing means which are split up into a number of successive stations (5, 6, 7) arranged at a distance from one another along the axis (x), and in causing the rollers (3, 4) to revolve about their axes of rotation between the stations (5, 6, 7) in such a way as to display, at each of the stations, different faces of each product, wherein three analysing stations (5–7) are arranged along the conveyer line, and each of the analysing stations is equipped with at least one camera (8, 9, 12, 14) which is orientated and adapted to make, with an adjustable frequency, photographs of the products transported by the conveyer line, one of the stations (5) having two cameras (8, 9) which are arranged on either side of the conveyer line in the same vertical plane orthogonal to the axis (x), and are orientated in such a way that their respective optical axes form a V which is centred on the axis (x) and has a vertex angle substantially in the range between 90° and 130°, the other two stations (6, 7) each comprising a camera (12, 14) which is arranged plumb with the conveyer line and is orientated in such a way that its optical axis is vertical and secant with the axis (x), in a preliminary phase, there are determined the average diameter of the products to be analysed and, as a function of the average diameter, a speed of rotation of the rollers (3, 4) which is adapted so that a product of average diameter which is located in the plane of a camera (8, 9) at the first station (S) and is caused to revolve on itself along the whole of the analysing means under the effect of the rotation of the rollers, undergoes a rotation such that four complementary zones on its surface are viewed by the respective cameras (8, 9, 12, 14) of the first, second and third stations (5–7), and during the conveying of the products, the rollers (3, 4) are caused to revolve continuously at the predetermined speed of rotation, and for each product, at least three photographs of this product are made by each camera at the first station (5), at least one photograph of this product is made by each camera at the second station (6), and at least three photographs of this product are made by each camera at the third station (7), the theoretical diameter of this product is calculated from the photographs made, and comparing the theoretical diameter of this product with the predetermined average diameter to determine a selection of one of the photographs made at each of the cameras of the three stations to have a set of selected photographs allowing analysis of this product's complete surface with only a given overlap of surface between any two of the selected photographs.

17. An analysing method as claimed in claim 16, wherein a speed of rotation of the rollers (3, 4) is determined, which speed of rotation is adapted so that a product of average diameter undergoes a rotation on itself with an angle of rotation substantially in the range between 110° and 130° between the first and second stations (5, 6), and with an angle of rotation substantially in the range between 105° and 115° between the second and third stations (6, 7).

18. An analysing method as claimed in claim 17, wherein the stations (5–7) of analysing means are arranged in such a way that the distance between the first and second stations (5, 6) is substantially in the range between 1.1 and 1.2 times the distance between the second and third stations (6, 7), and the rollers (3, 4) are caused to revolve in rotation at a constant speed of rotation along the whole of the analysing device.

19. An analysing method as claimed in claim 16, wherein a speed of rotation of the rollers (3, 4) is determined which is adapted so that a product of average diameter undergoes a rotation on itself with an angle of rotation substantially equal to 125.5° between the first and second stations (5, 6), and with an angle of rotation substantially equal to 109° between the second and the third stations (6, 7).

20. An analysing method as claimed in claim 17, wherein the distance between the first and second stations (5, 6) is substantially equal to 1.15 times the distance between the second and third stations (6, 7).

* * * * *

UNITED STATES PATENT AND TRADEMARK OFFICE
CERTIFICATE OF CORRECTION

PATENT NO. : 6,888,082 B1
DATED : May 3, 2005
INVENTOR(S) : Philippe Blanc

It is certified that error appears in the above-identified patent and that said Letters Patent is hereby corrected as shown below:

<u>Title page,</u>
Item [73], Assignee, change "Fruitier" to -- Fruitiere --.

Signed and Sealed this

Twelfth Day of July, 2005

JON W. DUDAS
*Director of the United States Patent and Trademark Office*